(12) United States Patent
Arnold et al.

(10) Patent No.: US 10,993,370 B2
(45) Date of Patent: May 4, 2021

(54) AGRICULTURAL WORKING DEVICE (71) Applicant: Müthing GmbH & Co. KG, Winterberg (DE)

(72) Inventors: Martin Arnold, Steinlah (DE); Michael Müthing, Winterberg (DE)

(73) Assignee: Müthing GmbH & Co. KG, Winterberg (DE)

( * ) Notice: Subject to any disclaimer, the term of this patent is extended or adjusted under 35 U.S.C. 154(b) by 155 days.

(21) Appl. No.: 16/179,034

(22) Filed: Nov. 2, 2018

(65) Prior Publication Data

US 2019/0133038 A1 May 9, 2019

(30) Foreign Application Priority Data

Nov. 6, 2017 (EP) .................................. 17001802

(51) Int. Cl.
| | | |
|---|---|---|
| *A01D 43/08* | (2006.01) | |
| *A01B 63/32* | (2006.01) | |
| *A01D 34/03* | (2006.01) | |
| *A01D 75/18* | (2006.01) | |
| *A01D 34/00* | (2006.01) | |

(Continued)

(52) U.S. Cl.
CPC ............ *A01D 43/085* (2013.01); *A01B 63/32* (2013.01); *A01D 34/005* (2013.01); *A01D 34/032* (2013.01); *A01D 34/535* (2013.01); *A01D 75/182* (2013.01); *A01B 33/103* (2013.01); *A01B 33/16* (2013.01); *A01B 35/28* (2013.01); *A01F 29/095* (2013.01); *A01G 3/002* (2013.01)

(58) Field of Classification Search
CPC .. A01D 43/085; A01D 75/182; A01D 34/005; A01D 34/032; A01D 34/535; A01B 63/32; A01B 33/103; A01B 33/16; A01B 35/28; A01F 29/095; A01G 3/002
See application file for complete search history.

(56) References Cited

U.S. PATENT DOCUMENTS 3,769,666 A * 11/1973 Kaufman ............... D06C 13/00
26/15 R
4,190,209 A * 2/1980 deBuhr ................. A01F 29/095
241/101.762

(Continued)

FOREIGN PATENT DOCUMENTS

DE 10 2009 046 821 A1 5/2011
EP 0 734 646 A1 10/1996

(Continued)

*Primary Examiner* — Abigail A Risic
(74) *Attorney, Agent, or Firm* — McGlew and Tuttle. P.C.

(57) ABSTRACT

An agricultural working device, such as a mulcher, is improved with a working rotor which is driven by a drive shaft and a cutting rail with a cutting edge which can be directed towards the working rotor. Sensors for acquiring parameters of working rotor and/or cutting rail are provided. An electronic control apparatus is provided with at least one encoder to set the cutting rail. A method for setting the position of a cutting rail of a working device, such as a mulcher, relative to a working rotor, is configured in such a way that the rotational speed of a drive shaft and the rotational speed of the working rotor are measured and compared with one another. When a ratio of the rotational speeds differs by a predefined threshold, a change in the position of the cutting rail is brought about.

20 Claims, 5 Drawing Sheets

(51) Int. Cl.
*A01G 3/00* (2006.01)
*A01B 33/16* (2006.01)
*A01B 35/28* (2006.01)
*A01F 29/09* (2010.01)
*A01D 34/535* (2006.01)
*A01B 33/10* (2006.01)

(56) References Cited

U.S. PATENT DOCUMENTS

| | | | | |
|---|---|---|---|---|
| 4,198,006 A | * | 4/1980 | Rolfe | A01F 29/095 241/222 |
| 4,474,336 A | * | 10/1984 | Fleming | A01F 29/095 241/221 |
| 4,479,346 A | * | 10/1984 | Chandler | A01D 34/42 241/37 |
| 4,799,625 A | * | 1/1989 | Weaver, Jr. | A01D 34/62 241/101.71 |
| 4,934,612 A | * | 6/1990 | Johnson | A01F 29/095 241/101.77 |
| 5,018,342 A | * | 5/1991 | McClure | A01F 29/09 241/101.71 |
| 5,083,976 A | * | 1/1992 | McClure | A01F 29/09 460/1 |
| RE34,946 E | * | 5/1995 | Weaver | A01F 29/09 241/101.71 |
| 6,886,314 B2 | * | 5/2005 | Pirro | A01D 43/08 56/10.2 R |
| 7,874,504 B2 | | 1/2011 | Chapman et al. | |
| 9,125,342 B2 | * | 9/2015 | Behnke | A01D 43/085 |
| 2005/0218254 A1 | | 10/2005 | Wolf et al. | |
| 2008/0268928 A1 | * | 10/2008 | Birrell | A01F 29/02 460/112 |
| 2012/0293157 A1 | * | 11/2012 | Loebe | B24B 3/363 324/71.1 |
| 2014/0215985 A1 | * | 8/2014 | Pollklas | A01D 43/085 56/10.2 R |

FOREIGN PATENT DOCUMENTS

| | | |
|---|---|---|
| EP | 1 839 477 A1 | 10/2007 |
| EP | 2 764 767 A2 | 8/2014 |
| WO | 82/01299 A1 | 4/1982 |

* cited by examiner

AGRICULTURAL WORKING DEVICE

CROSS REFERENCE TO RELATED APPLICATIONS

This application claims the benefit of priority under 35 U.S.C. § 119 of European Application 17 001 802.2, filed Nov. 6, 2017, the entire contents of which are incorporated herein by reference.

TECHNICAL FIELD

The invention relates to an agricultural working device for processing biomass, such as parts of plants, in particular a mulching device, mulching-mowing device or milling device having a working rotor which is driven by a drive shaft and a cutting rail with a cutting edge which can be directed towards the working rotor, and furthermore an agricultural system for processing biomass, such as parts of plants, having a tractor vehicle, carrier vehicle or drive vehicle or self-propelling, and a method for setting the position of a cutting rail of a mulcher relative to a working rotor of the mulcher.

BACKGROUND

Such agricultural working devices for separating and comminuting undergrowth, such as grass but also plant stubble, are used widely as separating devices and comminution devices, in particular as mulching devices, mulching-mowing devices or rotary cultivators, inter alia in the cultivation of fallow land and in conservation of the countryside as well as for agriculture. They are used there for mowing and comminuting plant growth, plant residues and biomass of a wide variety of types, such as for example grass, catch crops, plant stubble of grain, rape, corn, branches or bushes. These are separated from the soil by the working devices, picked up, comminuted by a working rotor of the working device and fed back to the soil again. The comminuted and distributed plant material on the soil rots quickly on the soil owing to its condition. It therefore serves as fertilizer for the soil, for the formation of humus and for field hygiene measures.

Such working devices can have, in addition to the working rotor, a cutting unit with at least one cutting rail which is arranged at a distance from the working roller within the housing of the working device. The distance between the cutting rail and the working roller forms a gap which primarily determines the size of the comminuted vegetation. In most working devices from the prior art, the cutting rail is arranged in a positionally fixed fashion, together with the cutting apparatus, within the housing of the working device. It is therefore not possible to carry out adaptation to different cutting lengths.

Individual working devices of the specified type in which the cutting apparatus or the cutting rail can be adjusted manually by the user are known. For this purpose, firstly attachment elements which hold the cutting apparatus on the housing of the working device are released. The cutting apparatus or the cutting rail is subsequently shifted and attached to the housing of the device again by means of the attachment elements. This process is very laborious under the frequently changing circumstances, for example when there are changes in material or biomass and in the weather, and does not permit any dynamic adaptation of the cutting apparatus during the operation of the device. Furthermore, the space in the interior of the housing is limited to such an extent that individual components which are arranged in the working path of the undergrowth to be comminuted significantly disrupt the working flow.

European patent application 17 001 686.9, which is also made fully a subject matter of the disclosure of the present application (European patent application 17 001 686.9 is incorporated herein by reference in its entirety), discloses an agricultural working device for processing biomass, such as parts of plants, in particular a mulching device, mulching-mowing device or milling device, having at least one cutting apparatus which has at least one cutting rail, wherein, in order to achieve continuous adjustability of the cutting apparatus by a user during the working process there is provision that the cutting rail can be adjusted by the user by means of a remote-controlled hydraulic cylinder.

On the one hand, the attention of the user is required elsewhere, with the result that he/she cannot always monitor the mulching process and himself perform necessary settings or adjustments, and on the other hand the mulching process is adversely affected by external influences, such as for example the change in the quality of the mulched material, in particular the change in its humidity.

SUMMARY

The invention is therefore based on an object of developing a device of the generic type and a method to the effect that the requirements mentioned above can be satisfied.

According to the invention, the specified object is achieved with a device of the generic type which is characterized by sensors for acquiring parameters of working rotor and/or cutting rail, an electronic control apparatus and at least one actuator element for setting the cutting rail. Furthermore, the invention provides an agricultural system for processing biomass, such as parts of plants, having a drive comprised by a tractor vehicle, a carrier vehicle or a drive vehicle or self-propelling as well as with more than one device according to the invention as defined above which is attached thereto and has a common control apparatus. Finally, the specified object is achieved with a method of the generic type which is characterized in that the rotational speed of a drive shaft and the rotational speed of a shaft of the working rotor are measured and compared with one another, and when the ratio of the rotational speeds differs beyond a predetermined threshold the position of the cutting rail is changed.

By means of the solution according to the invention, the operating states can be adapted to the given working conditions and/or controlled in accordance therewith. Possible actuator elements are, in particular, remote-controlled hydraulic cylinders, pneumatic adjustment means and electric servo motors. The rotational speed of the drive shaft can be that of a system shaft, such as that of the power take-off shaft of a carrier vehicle (tractor), of a pneumatic drive or of an electric drive motor.

One preferred development of the device according to the invention is characterized by a position sensor for determining the position of the cutting rail and/or of the cutting edge. A further preferred embodiment of the invention is characterized by rotational speed sensors for determining the rotational speed of the drive shaft and of a rotor shaft of the working rotor, and by configuration of the control apparatus to set the position of the cutting edge in such a way that the ratio of the rotational speeds is in a predefined range taking into account tolerances.

As a result of the configuration, the slip between the drive shaft and the rotor shaft is monitored and, if the latter is too large because the loading of the rotor with biomass or mulched material is too great, control for the sake of providing relief is performed to the effect that the gap width is increased, as a result of which the slip is reduced. On the other hand, if the slip is below a predefined value, the effectiveness can be increased by virtue of the fact that the gap width is reduced and therefore more effective comminution of the biomass and therefore more effective mulching is achieved. This also ensures, in particular, that the device can be operated in a favorable rotational speed range and therefore, for example, with little oscillation.

Other preferred developments of the invention are characterized by a torque sensor for determining the torque acting on one of the shafts and configuring the control apparatus to set the position of the cutting edge in order to avoid an overload and/or by a force sensor in between supporting parts which are connected to one another in an articulated fashion, of drive shaft and rotor for determining the power demand of the mulcher in conjunction with the signal of one of the rotational speed sensors, and by configuration of the control apparatus to set the position of the cutting edge in order to avoid an overload. The available power is adapted by means of such power control operations. If appropriate, a working method which is favorable in terms of consumption can take place or else the maximum available power can be utilized. It is also possible, in the case of suddenly occurring malfunctions, to open the cutting gap quickly, in order to avoid consequential damage.

Moreover, pressure sensors for measuring the pressures in a cylinder which moves the cutting rail can be provided on both sides of a piston face of the piston of the cylinder, wherein the pressure sensors are connected to the control apparatus via signal lines.

Moreover, in one preferred development, the invention provides that the actuator element, in particular a four-three-way valve, by which the electronic control apparatus is actuated to act on a cylinder in order to set the position of the cutting rail, wherein an operator control unit is provided which is connected bidirectionally to the control apparatus and has the purpose of operating the control apparatus and displaying the parameters which are controlled thereby. The ISO-BUS can serve as a connection, and the operator control can be carried out via said ISO-BUS.

Finally, one development is configured by means of a green sensor for determining the degree of greening of the biomass to be mulched and by configuration of the control apparatus to set the position of the cutting edge as a function of the degree of greening and, if appropriate, amount of biomass occurring.

Further developments of the method according to the invention provide that when the ratio of the rotational speed of the working rotor with respect to the rotational speed of the drive shaft is undershot with respect to a predefined value the cutting gap is increased by a predefined value, or that when the ratio of the rotational speeds of the working rotor and the drive shaft is exceeded beyond a predefined value the cutting gap is reduced by a predefined value, and/or that the checking of the cutting gap is performed quasi-continuously, and at each checking phase in each case one of the above-mentioned steps is carried out again. In this context, in one preferred configuration of the method there is provision that the torque at at least one of the shafts is measured, and the position of the cutting edge is set in order to limit the torque and/or to avoid an overload.

Furthermore, the rotational speed of the shafts is measured which are mounted movably with respect to one another by means of a gear mechanism connection, and the position of the cutting edge is controlled in order to avoid an overload in conjunction with the measurement of one of the rotational speeds of the shafts and/or the degree of greening of biomass to be mulched is measured, and the position of the cutting edge is set on the basis of this measurement.

Further advantages and features of the invention can be found in the claims and the following description in which exemplary embodiments of the invention are explained in detail with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
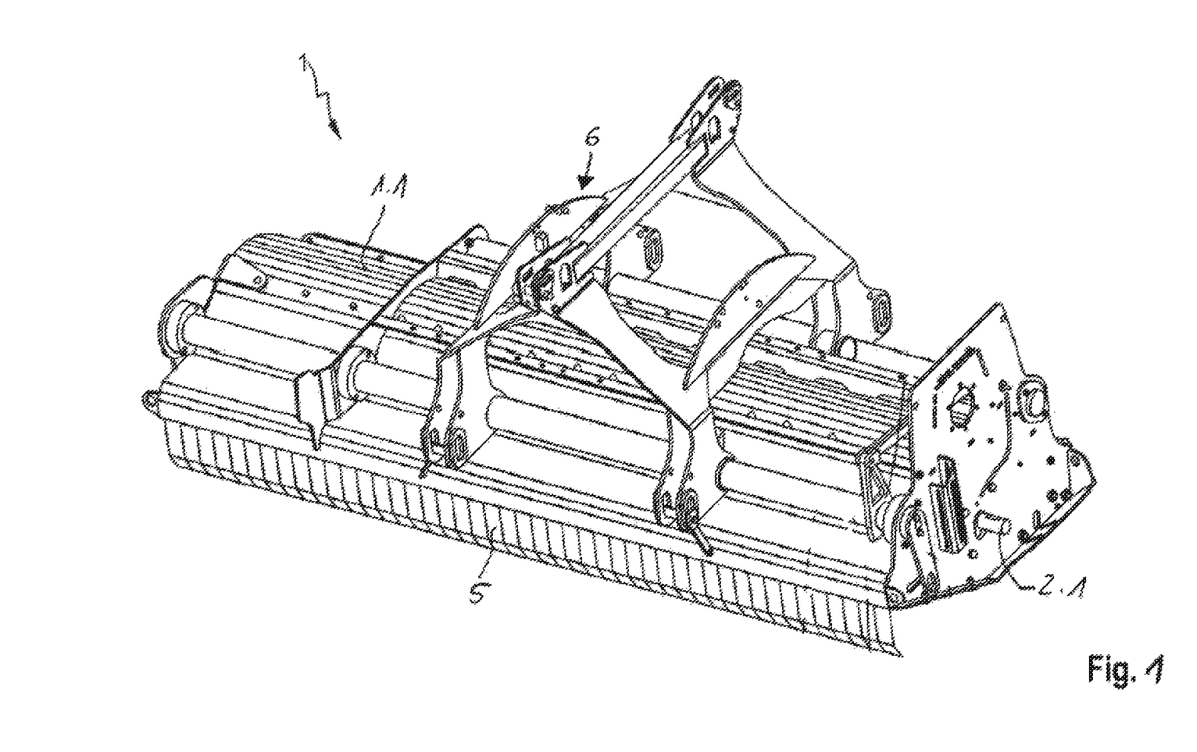
FIG. 1 is a perspective view showing an agricultural working device according to the invention in its structural-mechanical configuration.
Figure 2:
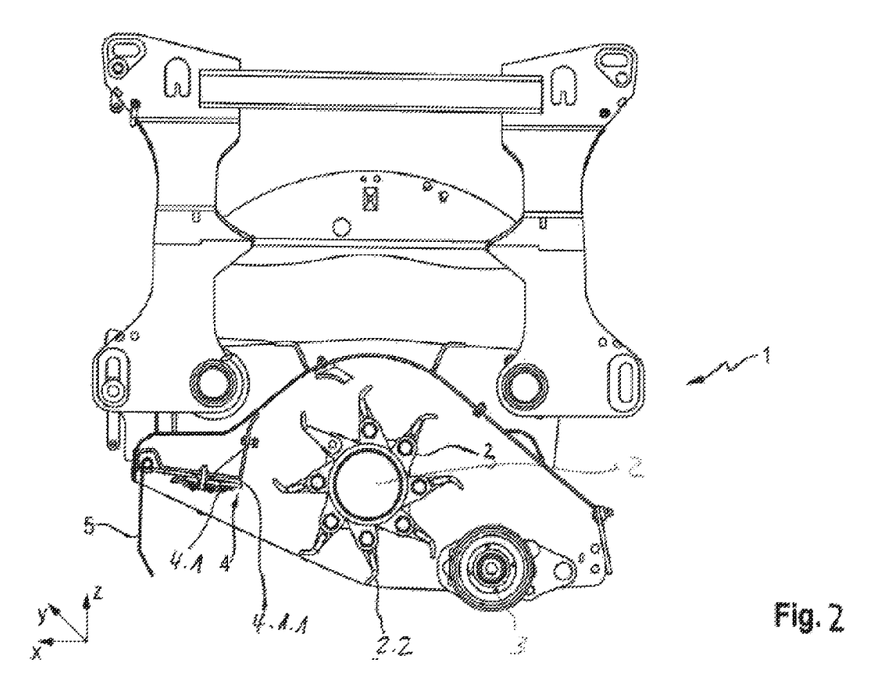
FIG. 2 is a side view, perpendicular with respect to the rotational axis of its rotor, showing a section through the working device in FIG. 1.

Referring to the drawings, FIGS. 1 and 2 show that an agricultural working device according to the invention of a mulcher 1 has a mulcher housing 1.1. A working rotor 2 with a rotor shaft 2.1 is located in the mulcher housing 1.1. Rotor beaters 2.2, which can pivot through an angle which can be limited, are arranged on the working rotor 2. A cutting apparatus 4 with an adjustable cutting rail 4.1 is assigned to the working rotor 2. The length of the individual fibers of the mulching material is determined by the size of the gap between a cutting edge 4.1.1 of the cutting rail 4.1 and the outer end of the rotor beaters 2.2. The adjustment of the cutting rail 4.1 is carried out by means of a double-acting hydraulic or pneumatic cylinder 4.2 with a piston 4.3, which is preferably a hydraulic cylinder. Furthermore, a support roller 3 is provided upstream of the working rotor 2 in the direction of travel, and pivotably mounted protection plates 5 are provided downstream of the cutting apparatus 4 in the direction of travel. The mulcher is attached to a tractor by means of a supporting block 6.

Figure 3:
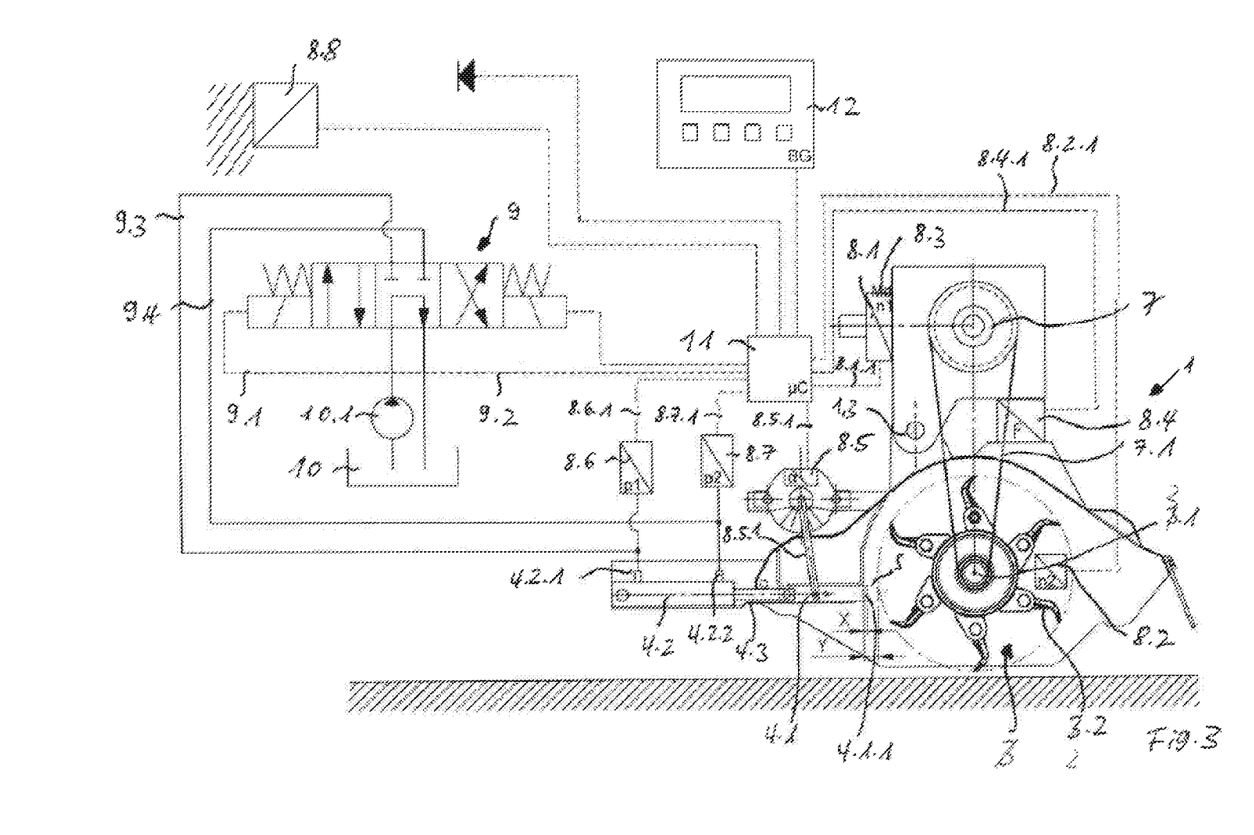
FIG. 3 is a schematic view of the working device in FIGS. 1 and 2 with a schematic illustration of a drive and a controller for a counter-cutter which is assigned to the rotor.

The drive of the working rotor 2 is provided by a PTO shaft of a tractor (not illustrated) via a drive shaft 7 of the mulcher 1 and a drive belt 7.1 which is guided from the latter about the shaft 3.1 of the drive rotor 2 (FIG. 3). In the illustrated preferred exemplary embodiment, the mulcher 1 has the following sensors:

A supporting or bearing part 1.1 of the drive shaft 7 and supporting or bearing parts 1.2, such as a mulcher housing, of the working rotor 2 are connected to one another in an articulated fashion by a joint 1.3. A force sensor 8.4, which forms a counterbearing between these two parts 1.1, 1.2, is arranged at a horizontal distance from the joint 1.3, between the parts 1.1 and 1.2.

Furthermore, a green sensor 8.8 for determining the degree of greening of the biomass to be mulched is provided, on the basis of the measurement of which green sensor 8.8 the position of the cutting edge can be set by the control apparatus 11 in accordance with the state of the biomass, depending on whether it is moist or dry.

The drive shaft 7 is assigned a first rotational speed sensor 8.1 for determining the rotational speed n1 of the drive shaft 7.

The rotational speed n2 of the rotor shaft 2.1 and therefore the rotor 2 is determined by a second rotational speed sensor 8.2 which is assigned thereto. A torque sensor 8.3 for measuring the torque which acts on the drive shaft 7 is assigned to the drive shaft 7. In this context, the rev counter 8.1 can be integrated in the torque sensor 8.3. An actual value of the mechanical input power ($P=Md*\Omega$) for the comminution process and therefore that corresponding to the electrical power demand ($P=U*I$) is determined by means of the torque sensor 8.3 and the rev counter 8.1. Said electrical power demand can be monitored continuously and/or used as a guide variable for setting the cutting gap. In the case of a sudden increase in the power as a result of an overload of the working rotor, which is transferred to the drive shaft 7 and therefore can be detected by the torque sensor 8.3, the gap between the cutting edge 4.1.1 and the rotor beaters 2.2 can be increased and therefore system relief or elimination of faults can be brought about.

The distance 8 between the cutting edge 4.1.1 and the next point on the maximum contour of the circulation path of the outer edges of the rotor beaters 2.2 is defined as the cutting gap S.

In the case of highly changing material, a control process can take place to the effect that the torque, the rotational speed and therefore also the consumption of fuel are kept constant and, in particular, are also limited. The limitation makes it possible for relatively small tractors to be able to serve relatively large mulchers—taking into account the different mulching result.

In order to determine the position a of the cutting rail 4.1 and therefore the position of the cutting edge 4.1.1 a position sensor 8.5 is proposed which is preferably embodied as a rotary potentiometer or as a linear encoder, if appropriate as a part of the adjustment element itself.

The cylinder is assigned, on both sides of a sealing plate of the piston 4.3, pressure sensors 8.6, 8.7 for determining the pressure P1, P2 in the respective sub-chamber of the cylinder 4.2.

The force sensor 8.4 has a function which is comparable with the torque sensor 8.3. On the basis of its signal F in conjunction with a rotational speed signal, in particular the rotational speed signal n1 of the rotational speed sensor 8.1, the required power demand for the given mulch material processed by the rotor can be determined, with the result that the acquired sensor values of the sensor 8.4 can be used in conjunction with the sensor 8.1 in the same way in particular to control the power and, if appropriate, limit the power.

The supply and control of the hydraulic cylinder 4.2 is carried out by means of a 4/3-way valve 9 which when operating with a hydraulic cylinder 4.2, is supplied from a hydraulic oil reservoir 10 via a pump 10.1. In accordance with the control by means of a control input line 9.1 and 9.2, the two inlets of the hydraulic cylinder are then acted on via hydraulic lines 9.3 and 9.4 in the usual way.

The schematic illustration in FIG. 3 furthermore shows a microcomputer 11 for controlling the hydraulic cylinder 4.2 on the basis of the input values of the sensors 8.1 to 8.7 and an operator control unit 12 for controlling the microcomputer 11.

The sensors 8.6-8.7 are connected via signal lines 8.6.1 to 8.7.1 to the control apparatus 11. The control apparatus 11 is connected via control lines 11.1, 11.2 to the 4/3-way valve of the configuration thereof.

Figure 4:
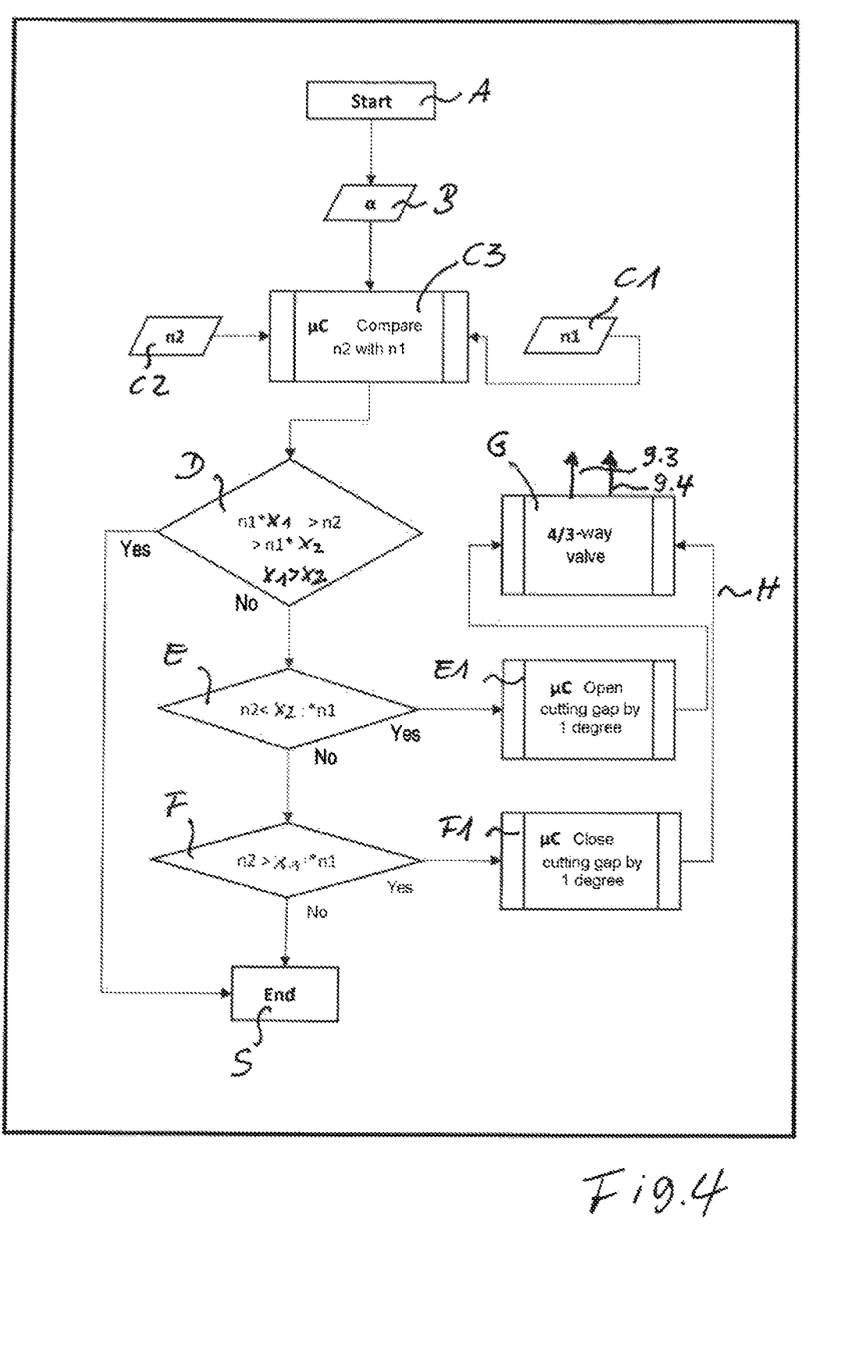
FIG. 4 is a flow chart relating to the control of the counter-cutter.

The sequence of the method according to the invention is illustrated in FIG. 4 and takes place as follows:

After the starting of the mulcher according to step A, firstly in step B the position of the cutting rail 4.1 and therefore the cutting edge thereof are determined. In the text which follows i.e. in steps C1 and C2, the rotational speeds n1 and n2 are determined and a comparison thereof (step C3) takes place by means of the microcomputer. If the rotational speeds largely correspond—except for tolerances —, wherein the tolerances can lie, for example, in the order of magnitude of 3% (comparison in step D), no action is necessary and the monitoring step is ended (step D), and this individual monitoring process is ended (step G). Such a monitoring process is repeated quasi-continuously at predefined time intervals, which is indicated by the dashed line H which leads from the end to the bar.

If it becomes apparent in step D that the difference of the rotational speed n2 from the rotational speed n1 is greater than the predefined tolerance, in the illustrated exemplary embodiment it is firstly expressed in the following step E whether the rotational speed n2 is lower than the rotational speed n1 taking into account a tolerance value (multiplier× 2). If this is the case, the microcomputer receives a corresponding sensor signal and actuates the 4/3-way valve 9 in step E1 to the effect that it the cutting gap between the cutting edge 4.1.1 and the outer circumference of the rotor 2 of the beaters 2.2 by a predefined small value, for example by a value which corresponds, for example, to pivoting through 1° of the potentiometer 8.5 which is connected to the cutting rail 4.1 or the piston 4.3 via a lever 8.5.1.

As stated, the checking process of the rotational speeds n1, n2 is repeated continuously or quasi-continuously. The actuation takes place in such a way that the 4/3-way valve 9 applies hydraulic oil to the cylinder 4.2 via the line 9.4 and the inlet 4.2.2 of the cylinder, with the result that the piston 4.3 is pulled back.

The monitoring takes place, as stated, continuously or quasi-continuously. If the rotational speed n2 is still lower than the rotational speed n1 taking into account tolerances in the next monitoring phase, further opening of the valve takes place in the described way until, when the checking occurs in step D, it is detected that the rotational speed n2 corresponds to the rotational speed n1 under the tolerance range which is provided there.

If it becomes apparent in step E that the rotational speed n2 is not below the rotational speed value n1 taking into account the tolerance, in the next step F it is checked whether it lies above the rotational speed n1 taking into account the tolerance. If this is the case, closing of the cutting gap between the cutting edge 4.1.1 and the rotor beaters 4.2 by 1° takes place in step F1, in the way described with reference to step E1, wherein this closing process is repeated, if appropriate, in the further monitoring phases which follow one another quasi-continuously, until the rotational speeds n1 and n2 correspond, taking into account the tolerances, and therefore the desired ratios are achieved.

Figure 5:
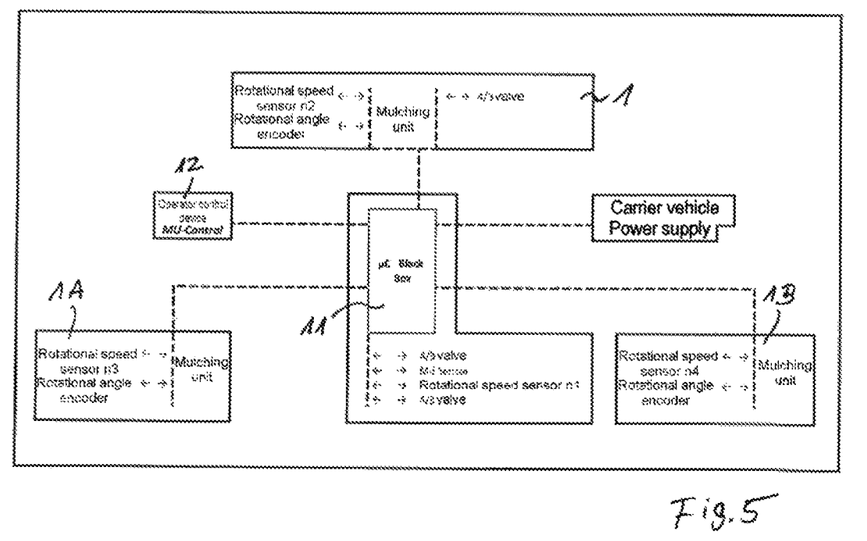
FIG. 5 is a block circuit diagram illustrating of a system of a tractor (drive) with three working devices which are provided thereon.

The schematic illustration in FIG. 5 illustrates that a plurality of mulchers 1, in this case three, can be arranged or connected to a locomotion unit (tractor) with the suitable controller 11, specifically a front mulcher 1 and to the left and right two lateral mulchers 1A and 1B, as a result of which the working width or mulching width can be increased. Basically three mulchers can also be provided in a thrust configuration.

While specific embodiments of the invention have been shown and described in detail to illustrate the application of the principles of the invention, it will be understood that the invention may be embodied otherwise without departing from such principles.

What is claimed is:

1. An agricultural working device for processing biomass, including any of a mulching device, a mulching-mowing device or a milling device, the agricultural working device comprising:
    a drive shaft;
    a working rotor, which is driven by the drive shaft, the working rotor comprising a rotor shaft;
    a cutting rail with a cutting edge, said cutting edge being directed towards the working rotor;
    sensors for acquiring parameters of the working rotor or parameters of the cutting rail, the sensors comprising rotational speed sensors for determining a rotational speed of the drive shaft and determining a rotational speed of the rotor shaft of the working rotor;
    at least one actuator element to set the position of the cutting edge; and
    an electronic control apparatus configured to:
        compare the rotational speed of the drive shaft and the rotational speed of the rotor shaft of the working rotor with one another; and
        change the position of the cutting rail when the ratio of the rotational speed of the drive shaft and the rotational speed of the rotor shaft of the working rotor differs beyond a predefined threshold.

2. An agricultural working device according to claim 1, wherein the sensors further comprise a position sensor for determining a position of the cutting rail or determining a position of the cutting edge or determining a position of the cutting rail and a position of the cutting edge.

3. An agricultural working device according to claim 1, wherein:
    the sensors further comprise a torque sensor for determining torque acting on the drive shaft or the rotor shaft or the drive shaft and the rotor shaft; and
    the electronic control apparatus is further configured to set the position of the cutting edge in order to avoid a torque overload.

4. An agricultural working device according to claim 1, wherein:
    the sensors further comprise a force sensor between supporting parts of drive shaft and rotor, which supporting parts are connected to one another in an articulated fashion, for determining a power demand of the agricultural working device in conjunction with a signal of one of the rotational speed sensors; and
    the control apparatus is further configured to set the position of the cutting edge in order to avoid a power demand overload.

5. An agricultural working device according to claim 1, wherein:
    the at least one actuator element is associated with a cylinder with a piston which moves the cutting rail;
    the sensors further comprise sensors for measuring pressure in the cylinder, on both sides of a piston face of the piston; and
    signal lines connecting the pressure sensors to the control apparatus.

6. An agricultural working device according to claim 5, wherein:
    the actuator element comprises a four-three-way valve, by which the electronic control apparatus is actuated; and
    the actuator element is configured to act on the cylinder to set the position of the cutting rail.

7. An agricultural working device according to claim 1, further comprising an operator control unit connected bidirectionally to the control apparatus, the operator control unit being configured to operate the control apparatus and to display parameters which are controlled thereby.

8. An agricultural working device according to claim 1, further comprising a green sensor for determining a degree of greening or a mass of the biomass to be mulched or a degree of greening and a mass of the biomass to be mulched, wherein the control apparatus is configured to set the position of the cutting edge as a function of the degree of greening of the biomass.

9. A method for setting a position of a cutting rail of an agricultural working device relative to a working rotor of the working device, the method comprising:
    providing an agricultural working device comprising a drive shaft, a working rotor, a cutting rail with a cutting edge, sensors for acquiring parameters of the working rotor or parameters of the cutting rail, at least one actuator element to set the position of the cutting edge and an electronic control apparatus, the working rotor being driven by the drive shaft, the working rotor comprising a rotor shaft, the cutting edge being directed towards the working rotor, the sensors comprising rotational speed sensors;
    measuring a rotational speed of a drive shaft and the rotational speed of a rotor shaft of the working rotor via the rotational sensors;
    comparing the measured rotational speed of the drive shaft and the rotational speed of the rotor shaft of the working rotor with one another via the electronic control apparatus; and
    changing the position of the cutting rail via at least the electronic control apparatus when the ratio of the rotational speed of the drive shaft and the rotational speed of the rotor shaft of the working rotor differs beyond a predefined threshold.

10. A method according to claim 9, wherein when the ratio of the rotational speed of the working rotor with respect to the rotational speed of the drive shaft is undershot with respect to the predefined value, a cutting gap is increased by a predefined value.

11. A method according to claim 9, wherein when the ratio of the speed of the drive shaft and the rotational speed of the rotor shaft of the working rotor is exceeded beyond a predefined value a cutting gap is reduced by a predefined value.

12. A method according to claim 9, wherein a checking of a cutting gap is performed quasi-continuously, and at each checking phase the step is carried out by:
    increasing the cutting gap by a predefined value when the ratio of the rotational speed of the working rotor with respect to the rotational speed of the drive shaft is undershot with respect to the predefined value; or
    reducing the cutting gap by a predefined value when the ratio of the rotational speed of the drive shaft and the rotational speed of the rotor shaft of the working rotor is exceeded beyond the predefined value.

13. A method according to claim 9, wherein:
torque at at least one of the rotor shaft of the working rotor and the drive shaft is measured; and
the position of the cutting edge is set to limit the torque or to avoid a torque overload or to limit the torque and to avoid a torque overload.

14. A method according to claim 9, wherein the drive shaft and the rotor shaft of the working rotor are mounted movably with respect to one another by means of a gear mechanism connection, and the position of the cutting edge is controlled to avoid an overload in conjunction with the measurement of the rotational speed of the drive shaft and the rotational speed of the rotor shaft of the working rotor.

15. A method according to claim 9, wherein a degree of greening of biomass to be mulched is measured, and the position of the cutting edge is set on the basis of this measurement.

16. An agricultural system for processing biomass, such as parts of plants, the agricultural system comprising:
a drive; and
an agricultural working device connected to the drive for being moved thereby, the agricultural working device comprising a drive shaft, a working rotor, which is driven by the drive shaft, the working rotor comprising a rotor shaft, a cutting rail with a cutting edge directed towards the working rotor, sensors for acquiring parameters of the working rotor or parameters of the cutting rail or parameters of the working rotor or parameters of the cutting rail, the sensors comprising rotational speed sensors for determining a rotational speed of the drive shaft and determining a rotational speed of the rotor shaft of the working rotor, at least one actuator element to set the position of the cutting edge and an electronic control apparatus, wherein the system has a common control apparatus, the electronic control being configured to:
compare the rotational speed of the drive shaft and the rotational speed of the rotor shaft of the working rotor with one another; and
change the position of the cutting rail when the ratio of the rotational speed of the drive shaft and the rotational speed of the rotor shaft of the working rotor differs beyond a predefined threshold.

17. An agricultural system according to claim 16, wherein the sensors further comprise a position sensor for determining a position of the cutting rail or determining a position of the cutting edge or determining a position of the cutting rail and a position of the cutting edge.

18. An agricultural system according to claim 16, wherein:
the sensors further comprise a torque sensor for determining torque acting on the drive shaft or the rotor shaft or the drive shaft and the rotor shaft; and
the electronic control apparatus is further configured to set the position of the cutting edge in order to avoid a torque overload.

19. An agricultural system according to claim 16, wherein:
the sensors further comprise a force sensor between supporting parts of drive shaft and rotor, which supporting parts are connected to one another in an articulated fashion, for determining a power demand of the agricultural working device in conjunction with a signal of one of the rotational speed sensors; and
the control apparatus is further configured to set the position of the cutting edge in order to avoid a power demand overload.

20. An agricultural system according to claim 16, further comprising an operator control unit connected bidirectionally to the control apparatus, the operator control unit being configured to operate the control apparatus and to display parameters which are controlled thereby.

* * * * *